US010553003B2

(12) United States Patent
Zhang et al.

(10) Patent No.: US 10,553,003 B2
(45) Date of Patent: Feb. 4, 2020

(54) INTERACTIVE METHOD AND APPARATUS BASED ON WEB PICTURE

(71) Applicant: TENCENT TECHNOLOGY (SHENZHEN) COMPANY LIMITED, Shenzhen, Guangdong (CN)

(72) Inventors: Zhenwei Zhang, Guangdong (CN); Fen Xiao, Guangdong (CN); Jingjing Liu, Guangdong (CN); Wenpei Hou, Guangdong (CN); Ling Wang, Guangdong (CN); Zhehui Wu, Guangdong (CN); Xinlei Zhang, Guangdong (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 429 days.

(21) Appl. No.: 15/189,508

(22) Filed: Jun. 22, 2016

(65) Prior Publication Data

US 2016/0307351 A1 Oct. 20, 2016

Related U.S. Application Data

(63) Continuation of application No. PCT/CN2014/094829, filed on Dec. 24, 2014.

(30) Foreign Application Priority Data

Dec. 24, 2013 (CN) .......................... 2013 1 0722904

(51) Int. Cl.
*G06T 11/60* (2006.01)
*G06F 3/0484* (2013.01)
(Continued)

(52) U.S. Cl.
CPC .......... *G06T 11/60* (2013.01); *G06F 3/04842* (2013.01); *H04L 51/24* (2013.01);
(Continued)

(58) Field of Classification Search
CPC ........................ G06N 3/004–008; G06F 3/048
See application file for complete search history.

(56) References Cited

U.S. PATENT DOCUMENTS 5,880,731 A * 3/1999 Liles ...................... G06F 3/0481
345/473
6,229,533 B1 * 5/2001 Farmer ............... G06F 3/04815
345/473

(Continued)

FOREIGN PATENT DOCUMENTS

CN 101753473 A 6/2010
CN 102243692 A 11/2011
(Continued)

OTHER PUBLICATIONS

VisibleBody. "Human Anatomy Atlas—Android Tablet Tutorial." YouTube, YouTube, Mar. 27, 2013, www.youtube.com/watch?v=-KAmJRsHfq8. (Year: 2013).*
(Continued)

*Primary Examiner* — Jennifer N To
*Assistant Examiner* — Liang Y Li
(74) *Attorney, Agent, or Firm* — Brinks Gilson & Lione

(57) ABSTRACT

The present invention is applicable to the field of Internet, and provides an interactive method and apparatus based on a web picture. The method includes: obtaining a web picture including a human image; determining a region where a specific part of the human image in the web picture is located; receiving an interactive instruction in the region where the specific part is located, and generating the interactive information corresponding to the specific part. When
(Continued)

receiving the interactive instruction in the region where the specific part is located, generating the interactive information corresponding to the specific part by determining the region where the specific part of the human image in the obtained web picture including the human image is located. The interactive method provided by the embodiment of the present invention is simple to operate, and the interactive manners are various.

13 Claims, 6 Drawing Sheets

(51) Int. Cl.
*H04L 12/58* (2006.01)
*G06K 9/00* (2006.01)
*H04W 84/12* (2009.01)

(52) U.S. Cl.
CPC ............ *G06K 9/00362* (2013.01); *G06T 2207/20024* (2013.01); *G06T 2207/30196* (2013.01); *H04L 51/32* (2013.01); *H04W 84/12* (2013.01)

(56) References Cited

U.S. PATENT DOCUMENTS

| | | | |
|---|---|---|---|
| 2010/0141662 A1* | 6/2010 | Storey | G06T 13/40 345/473 |
| 2010/0251147 A1* | 9/2010 | Donovan | G06F 3/011 715/764 |
| 2011/0282686 A1 | 11/2011 | Venon et al. | |
| 2012/0069045 A1 | 3/2012 | Hashimoto et al. | |
| 2015/0019694 A1 | 1/2015 | Feng et al. | |
| 2015/0121251 A1* | 4/2015 | Kadirvel | H04M 1/72544 715/753 |
| 2015/0200889 A1* | 7/2015 | Hemar | H04L 51/10 715/748 |

FOREIGN PATENT DOCUMENTS

| | | |
|---|---|---|
| CN | 102461162 A | 5/2012 |
| CN | 103312804 A | 9/2013 |

OTHER PUBLICATIONS

International Search Report with English translation and Written Opinion of the ISA for PCT/CN2014/094829, ISA/CN, Haidian District, Beijing, dated Feb. 26, 2015.

* cited by examiner

INTERACTIVE METHOD AND APPARATUS BASED ON WEB PICTURE

This application is the Continuation Application of International Application No. PCT/CN2014/094829, titled "INTERACTIVE METHOD AND APPARATUS BASED ON WEB PICTURE", and filed on Dec. 24, 2014, which claims priority to Chinese Patent Application No. 201310722904.0 titled "NETWORK PICTURE INTERACTION METHOD AND NETWORK PICTURE INTERACTION DEVICE" and filed on the Chinese State Intellectual Property Office on Dec. 24, 2013, both of which are incorporated herein by reference in their entireties.

FIELD

The present disclosure relates to the field of internet, and in particular to an interaction method and an interaction device based on a network picture.

BACKGROUND

With the development of internet technology, information exchange has become increasingly easy and convenient. Users can exchange information rapidly through instant messaging software installed in internet terminals. A user can interact with a friend effectively by sending and receiving dynamic information on a personal page, for example, posting a new network picture in a personal space, receiving a comment in a friend circle or the like.

In an existing interaction method for a network picture in a social network, a message area is generally set on a page corresponding to the network picture, to record photo comment information from a user in the friend circle. However, the user is required to input much text information in this interaction method, of which operations are inconvenient. In addition, text interaction methods are limited in form.

SUMMARY

In order to address the above technical issue, an interaction method and an interaction device based on a network picture are provided according to embodiments of the present disclosure.

A network interaction method based on a picture is provided according to the embodiments of the present disclosure. The method includes:

obtaining a network picture including a human image;

determining a region where a specific part of the human image in the network picture is located; and receiving an interaction instruction located in the region where the specific part is located and generating interaction information corresponding to the specific part.

An interaction device based on a network picture is provided according to the embodiments of the present disclosure. The device includes one or more processors and a storage medium storing operation instructions. The one or more processors perform the following steps when the operation instructions in the storage medium are executed:

obtaining a network picture including a human image;

determining a region where a specific part of the human image of the network picture is located; and receiving an interaction instruction located in the region where the specific part is located, and generating interaction information corresponding to the specific part.

In the embodiments of the present disclosure, the region where the specific part of the human image in the obtained network picture including the human image is located is determined, and the interaction information corresponding to the specific part is generated in a case that the interaction instruction located in the region where the specific part is located is received. In the interaction method based on the network picture according to the embodiments of the present disclosure, the operations are simple and convenient, and the interaction is diverse.

BRIEF DESCRIPTION OF THE DRAWINGS

FIG. 2b is a diagram illustrating obtainment of a position of a face in a picture according to the embodiment of the present disclosure shown in FIG. 2a;

FIG. 2c is a diagram illustrating generation of a dynamic image corresponding to a picture according to the embodiment of the present disclosure shown in FIG. 2a;

FIG. 3b is a diagram illustrating display of a hand-shaped picture when a mouse is located in a facial region of a human image, according to the embodiment of the present disclosure shown in FIG. 3a;

FIG. 4b is a diagram illustrating effects of pinching a face according to the embodiment of the present disclosure shown in FIG. 4a;

FIG. 4c is a diagram illustrating effects of kissing a face according to the embodiment of the present disclosure shown in FIG. 4a;

DETAILED DESCRIPTION

In order to make the technical solution and advantages of the present disclosure clearer, the present disclosure is described in detail in conjunction with drawings and embodiments hereinafter. It should be understood that, the embodiments described herein are only to explain the present disclosure, but not to limit the present disclosure.

In the embodiments of the present disclosure, a network picture may be a network picture in a personal space of a social network, or a photo uploaded to a shared space or a community by a user, or a network picture in other application scenarios. An interaction message or a reply message posted by the user, a friend of the user or other users when they view the photo information can be received after the photo is uploaded to the personal space, the shared space or the community of the user.

In a conventional interaction method, message information inputted by a user is generally received in a message area of a page corresponding to a network picture, and operation modes are limited. The user needs to input text information which the user wants to express, and an input operation is inconvenient for more and more mobile terminal users.

An interaction method based on a network picture, which has a more simple operation and more diverse modes, is provided according to the embodiments of the present disclosure. The method includes: obtaining a network picture including a human image; determining a region where a specific part of the human image in the network picture is located; and receiving an interaction instruction located in the region where the specific part is located, and generating interaction information corresponding to the specific part.

The region where the specific part of the human image in the obtained network picture including the human image is located is determined, and the interaction information corresponding to the specific part is generated when the interaction instruction located in the region where the specific part is located is received. The interaction information corresponding to the specific part is generated once the interaction instruction is received, thereby having a simple and convenient operation, reducing power consumption of the interaction operation and facilitating a diversification of interaction methods.

Figure 1:
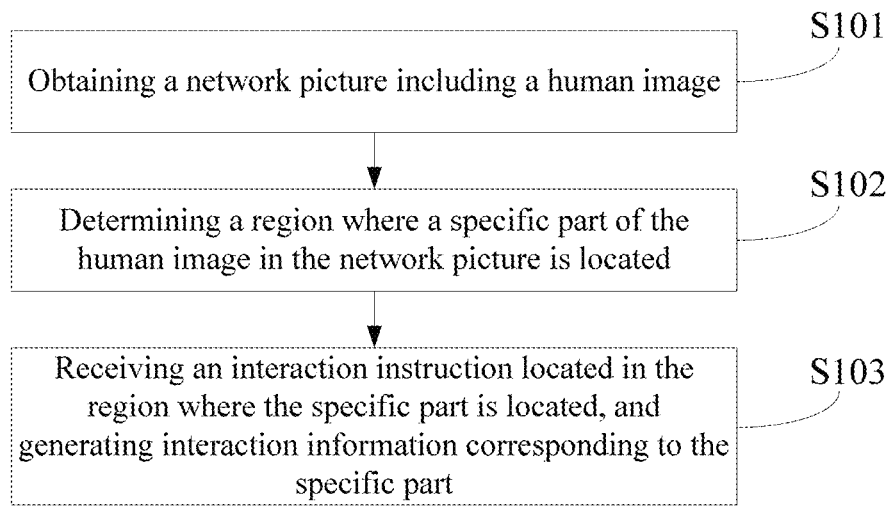
FIG. 1 is a flowchart of an interaction method based on a network picture according to an embodiment of the present disclosure.

FIG. 1 shows a flowchart of an interaction method based on a network picture according to an embodiment of the present disclosure. The method includes steps S101 to S103.

In step S101, a network picture including a human image is obtained.

In the embodiment, the network picture may include but is not limited to a photo uploaded to a social network by a user, or may also be a forwarded network picture or a network picture downloaded from other network spaces or a server. In a case that the network picture is located in the social network, permission information on the network picture may be that: the network picture is visible only to a friend circle or only a comment from the friend circle can be received, or the network picture is visible to all people and the comment from all people can be received.

The network picture may include all types of pictures. In the embodiment, the network picture may be differentiated into a network picture including a human image and a photo including no human image. The network picture including a human image and the network picture including no human image can be differentiated by identity information set by a user, which is received when the user uploads a photo; or by human face matching technology, where a network picture including a human face is identified as a photo including the human image; or by human shape matching, where a photo including a human shape is matched.

After the network picture is identified as a network picture including the human image, step S102 is performed.

In step S102, a region where a specific part of the human image in the network picture is located is determined.

In the embodiment, the specific part of the human image in the network picture may be a face, a shoulder, a hand, a belly or other parts of the human. As needed, the specific part may be flexibly defined by a system based on a requirement received from the user. For example, an organ of a head of the human image, including an eye, a nose, a mouth, an ear, and a forehead and a face of the head can be identified. And a region where each part is located is accordingly defined based on a size of the part, for example, a region where the belly is located may be a rectangular region of 3 centimeter×4 centimeter since a coverage of the region is large, and a region where the eye is located may be a region of 0.5 centimeter×0.5 centimeter.

In a case that the determined specific part of the human image in the network picture includes multiple parts, regions where different parts are located are marked with corresponding identity information, to identify a part corresponding to a region where the part is located. For example, a region where the belly is located is marked with '0001', and a corresponding part is the belly. Other parts are similar to this.

In step S103, an interaction instruction located in the region where the specific part is located is received and interaction information corresponding to the specific part is generated.

In a case that the interaction instruction located in the region where the specific part is located is received, dynamic information corresponding to the specific part is generated based on the region where the specific part corresponding to the interaction instruction is located. The dynamic information may include but is not limited to: a corresponding multimedia material which is generated based on information about the specific part, displaying a dynamic network picture which is generated based on a network picture corresponding to the specific part, displaying a dynamic network picture which is generated based on a called network picture or generating comment information. The multimedia material may include but is not limited to a network picture, an animation, music, text, or the like.

The generating of the network picture corresponding to the information about the specific part may include: calling a network picture of a 'pinch' gesture for the face, calling a network picture of a 'pat' gesture for the shoulder, and calling a network picture of a 'handshake' gesture for the hand.

The interaction information corresponding to the specific part may further include an interaction of an animation corresponding to the specific part. For example, for a face, based on a location where the interaction instruction is located, a dynamic image of a network picture corresponding to the location is generated by loading a filter and is further played. The filter includes a wave filter, a transparent filter and a mask filter. For example, an interaction instruction in the face which is from the user is received, a network picture in a region corresponding to the location where the interaction instruction is located is obtained, and a dynamic image having a 'twist' effect is generated by loading the wave filter and is played.

The interaction information corresponding to the specific part may further include generated comment information in a page where the network picture is located. For example, for an action of the shoulder, comment information such as 'XX pats your shoulder' may be generated, where 'XX' may be a user name or nickname of a user which sends the interaction instruction.

The various interaction information described above may include a combination of two or more thereof. Implementation processes of the interaction information are described in following embodiments.

In the embodiment of the present disclosure, the region where the specific part of the human image in the obtained network picture including the human image is located is determined, and the interaction information corresponding to the specific part is generated in a case that the interaction instruction located in the region where the specific part is located is received. The interaction method based on the network picture according to the embodiment of the present disclosure is simple and convenient in operation and diverse in interaction ways.

Figure 2A:
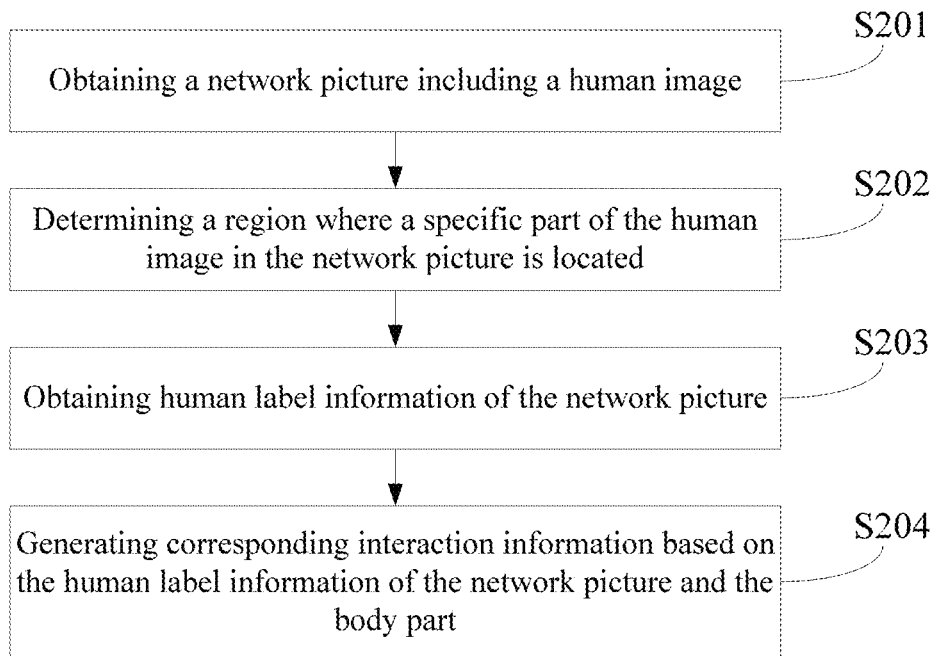
FIG. 2a is a flowchart of an interaction method based on a network picture according to an embodiment of the present disclosure.

FIG. 2a is a flowchart of an interaction method based on a network picture according to an embodiment of the present disclosure. The method includes steps S201 to S204.

In step S201, a network picture including a human image is obtained.

In step S202, a region where a specific part of the human image in the network picture is located is determined.

Steps S201 to S202 are the same as the steps S101 to S102 in the embodiment shown in FIG. 1, which are not repeated herein.

In step S203, human label information of the network picture is obtained.

The human label information of the network picture may include but is not limited to label information such as a baby, an adult, a child, a youth and the aged. Interaction information corresponding to the label information is generated based on various label information. For example, interaction information corresponding to the baby may include generation of a lip-shaped network picture, or may include generation of a 'kiss' dynamic image through loading a filter.

In the embodiment, the human label information may be obtained through image matching based on a feature matching algorithm, through receiving input label information when a user uploads the network picture, or based on a title or description of a photo from the user.

Figure 2B:
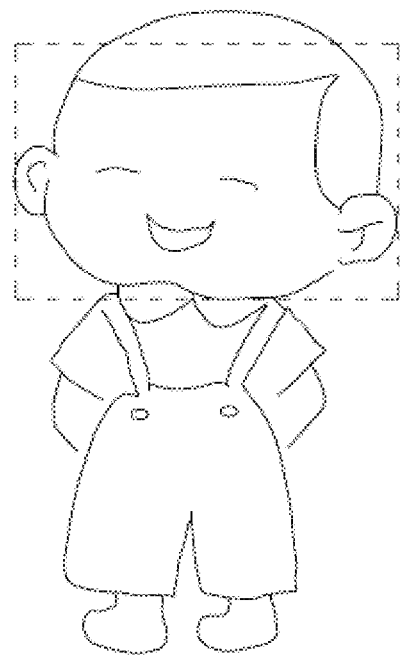

FIG. 2b is a diagram illustrating obtainment of a position of a face in a network picture. A rectangular region where the face is located is obtained through feature matching. Of course, it is only an embodiment. An elliptical region or the like, where the face is located, may be alternatively defined.

In step S204, an interaction instruction located in the region where the specific part is located is received, and corresponding interaction information is generated based on the human label information of the network picture and the specific part.

The embodiment differs from the embodiment shown in FIG. 1 in that, for the same part of the body, the corresponding interaction information may be generated based on the human label information according to the embodiment. For example, in response to an interaction instruction in a face of a baby, a network picture with interaction information of 'lip' kiss is called or generated, or comment information 'XX kisses your cheek' is generated. For a face of an adult, a network picture with interaction information of 'palm' stroke is called or generated, or comment information 'XX strokes your head for encouragement' is generated. In addition, a corresponding filter may be called for the comment information, and a change of transparency of a comment information box from the interaction instruction to a comment section is dynamically displayed through a css transparency label. 'XX' may be a username or nickname of a user which sends the interaction instruction.

Figure 2C:
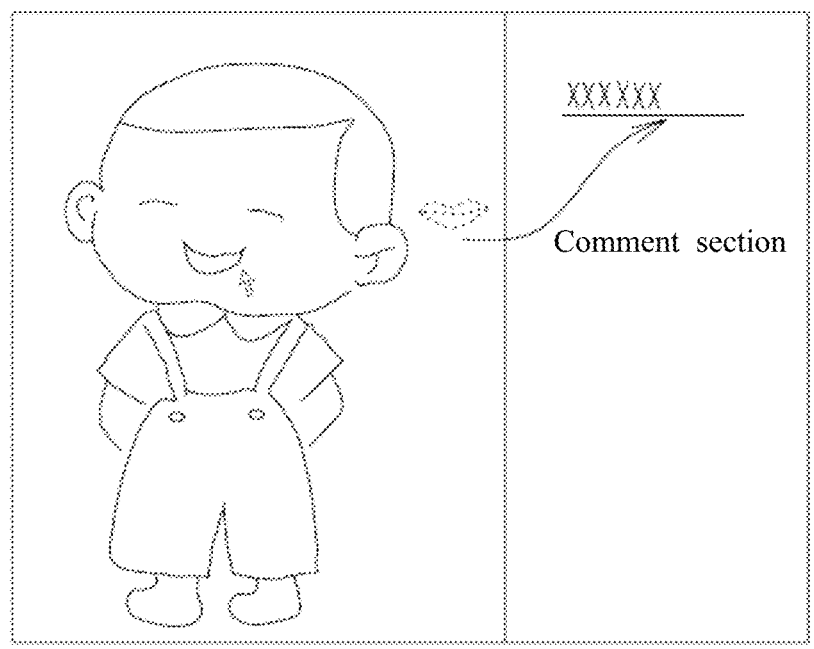

As shown in FIG. 2c, a label of the network picture is baby, in a case that the interaction instruction is identified in a face of the baby and a mouse is located in a region where the face of the baby is located, a lip-shaped network picture corresponding to the baby is called and displayed, or in a case that a click instruction is received, the lip-shaped network picture is processed by a filter through zoom and transparency, and a dynamic image is generated, to simulate a dynamic process of 'kissing'. In addition, the generating of the comment information is dynamically displayed on a page from a location of the interaction instruction to a location of the comment section, and the comment information may be displayed with a specific transparency, so that the user may perceive the generating of the comment information and view the network picture without being influenced.

According to the present embodiment based on the embodiment shown in FIG. 1, the label of the network picture is obtained, and the interaction information is generated based on a label distinction, thereby making the interaction more specific and improving diversification of the interaction method.

Figure 3A:
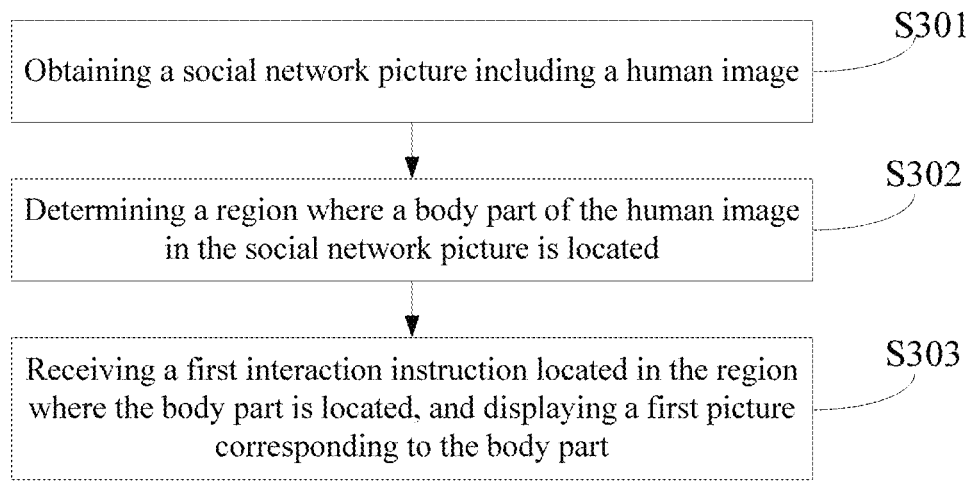
FIG. 3a is a flowchart of an interaction method based on a network picture according to an embodiment of the present disclosure.

FIG. 3a is a flowchart of an interaction method based on a network picture according to an embodiment of the present disclosure. The method includes steps S301 to S303.

In step S301, a network picture including a human image is obtained.

In step S302, a region where a specific part of the human image in the network picture is located is determined.

In step S303, a first interaction instruction located in the region where the specific part is located is received, and multimedia material corresponding to the specific part is displayed.

In a state of receiving a mouse operation instruction by a current system, the first interaction instruction is triggered when the mouse pointer is hovering (hovering) in the region where the specific part is located, and the multimedia material corresponding to the specific part is displayed. A correspondence between the specific part and the multimedia material may be predefined by the system. When the first interaction instruction is received, a network picture corresponding to the specific part is selected and is displayed at a location where the mouse hovers.

In a case that the system receives a touch instruction, the first interaction instruction may be a single-click touch instruction, and a corresponding network picture is displayed based on a location where the touch instruction is located.

Figure 3B:

The correspondence between the specific part and the multimedia material may include that, a leg corresponds to a network picture of massage action, a shoulder corresponds to a network picture massage action, or the like. As shown in FIG. 3b, when the mouse is located in a facial region of the human image, a hand-shaped network picture corresponding to the facial region is displayed, so that a user has a good interaction experience in an interaction process.

In the embodiment, a correspondence between the network picture and the specific part is established, and the network picture to be displayed is determined based on a location of the interaction instruction, thereby realizing a diverse interaction operation for respective parts of the body of the human image, and improving the interaction experience of user through the network picture corresponding to the interaction instruction.

Figure 4A:
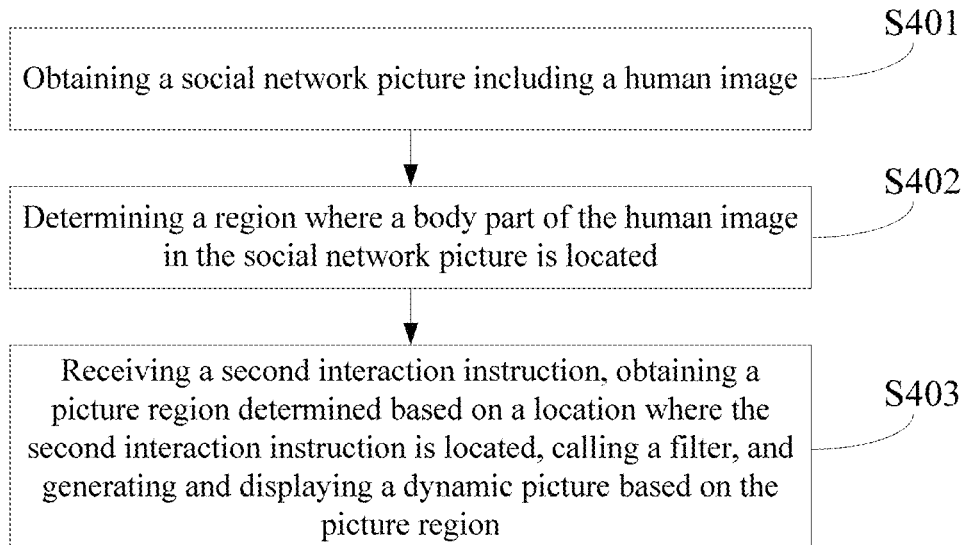
FIG. 4a is a flowchart of an interaction method based on a network picture according to an embodiment of the present disclosure.

FIG. 4a is a flowchart of an interaction method based on a network picture according to an embodiment of the present disclosure. The method includes steps S401 to S403.

In step S401, a network picture including a human image is obtained.

In step S402, a region where a specific part of the human image in the network picture is located is determined.

In step S403, a second interaction instruction is received, a network picture region determined based on a location where the second interaction instruction is located is obtained, a filter is called, and a dynamic network picture is generated and displayed based on the network picture region.

In the embodiment, in a case that a mouse operation instruction is received, the second interaction instruction may be a single-click instruction in the specific part sent from the mouse. In a case that a touch operation instruction is received, the second interaction instruction may be a touch click instruction. Of course, the second interaction instruction may be alternatively an interaction instruction input by another input device, which is not described herein.

Figure 4B:

In the embodiment, there are two network picture sources for the generated dynamic network picture. One network picture source is an image region at a location corresponding to the interaction instruction obtained from the network picture, such as an image region centering in the location corresponding to the interaction instruction and having a radius of 35 pixels. The image region is stretched through a wave filter, to simulate a dynamic effect of 'pinching', such as an effect of 'pinching' the face shown in FIG. 4b.

Figure 4C:
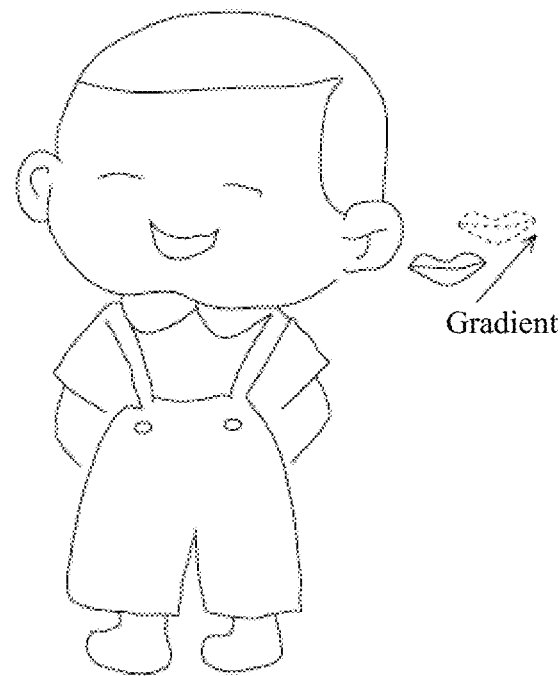

Another network picture source is a called network picture. For example, in a case that the interaction instruction is located at the face, a 'lip'-shaped picture is called, the picture is processed by a filter through zoom and transparency, and a dynamic effect of 'kissing' is achieved. The kissing effect is shown in FIG. 4c.

In the embodiment, the specific part of the human image corresponds to the specific dynamic image, thereby further improving realistic effects and diversification of the interaction operation, and achieving a more realistic experience for the user. The diverse interaction operation is simple, thereby simplifying an interaction operation for the user.

Figure 5:
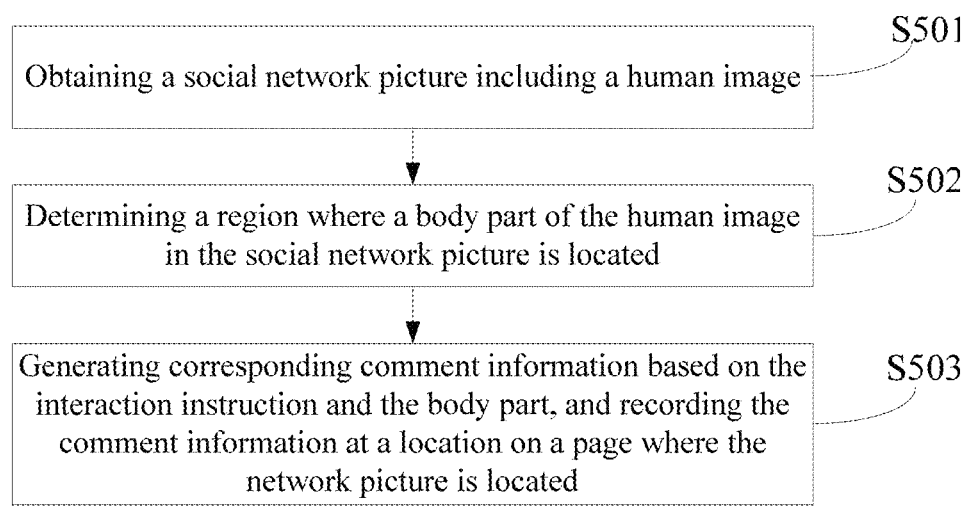
FIG. 5 is a flowchart of an interaction method based on a network picture according to an embodiment of the present disclosure.

FIG. 5 is a flowchart of an interaction method based on a network picture according to an embodiment of the present disclosure. The method includes steps S501 to S503.

In step S501, a network picture including a human image is obtained.

In step S502, a region where a specific part of the human image in the network picture is located is determined.

In step S503, corresponding comment information is generated based on an interaction instruction and the specific part, and is recorded at a location on a page where the network picture is located.

The comment information generated in this step may be combined with the aforementioned embodiments, i.e., the comment information is generated after the network picture is displayed. FIG. 2c shows effects of dynamically generated comment information.

In addition, the dynamic image according to the embodiment shown in FIG. 4a may be combined with the multimedia material generated according to the embodiment shown in FIG. 3a, i.e., the second interaction instruction is received after the first interaction instruction, thereby optimizing interaction effects.

In the embodiment, the interaction operation on the network picture is realized through a simple instruction and the corresponding comment information is generated, thereby making the operation convenient and simple, saving operation time for a user, and effectively promoting information interaction operations between users.

Figure 6:
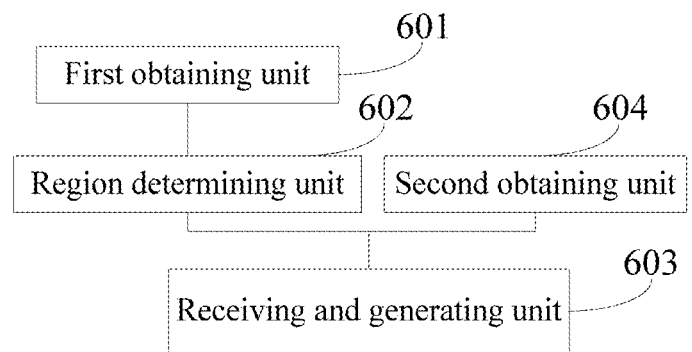
FIG. 6 is a structural block diagram of an interaction device based on a network picture according to an embodiment of the present disclosure.

FIG. 6 is a structural block diagram of an interaction device based on a network picture according to an embodiment of the present disclosure. The device includes a first obtaining unit 601, a region determining unit 602, and a receiving and generating unit 603.

The first obtaining unit 601 is configured to obtain a network picture including a human image.

The region determining unit 602 is configured to determine a region where a specific part of the human image in the network picture is located.

The receiving and generating unit 603 is configured to receive an interaction instruction located in the region where the specific part is located, and generate interaction information corresponding to the specific part.

Further, the device may include a second obtaining unit 604.

The second obtaining unit 604 is configured to obtain human label information of the network picture.

The receiving and generating unit 603 is configured to receive the interaction instruction located in the region where the specific part is located, and generate corresponding interaction information based on the human label information of the network picture and the specific part.

Specifically, the receiving and generating unit 603 is configured to receive a first interaction instruction located in the region where the specific part is located, and display multimedia material corresponding to the specific part; and/or receive a second interaction instruction, obtain a network picture region determined based on a location where the second interaction instruction is located, call a filter, and generate and display a dynamic network picture based on the network picture region.

Further, the receiving and generating unit 603 is configured to generate corresponding comment information based on the interaction instruction and the specific part, and record the comment information at a location on a page where the network picture is located.

The filter may include a wave filter, a transparent filter and a mask filter. The specific part includes a face, a shoulder and a hand.

The region determining unit 602 is configured to obtain the specific part of the human image through human image matching or through receiving identity information of the specific part of the human image the user.

The present embodiment of the disclosure is a device embodiment corresponding to method embodiments shown in FIGS. 1 to 5, which are not described repeatedly herein.

Figure 7:
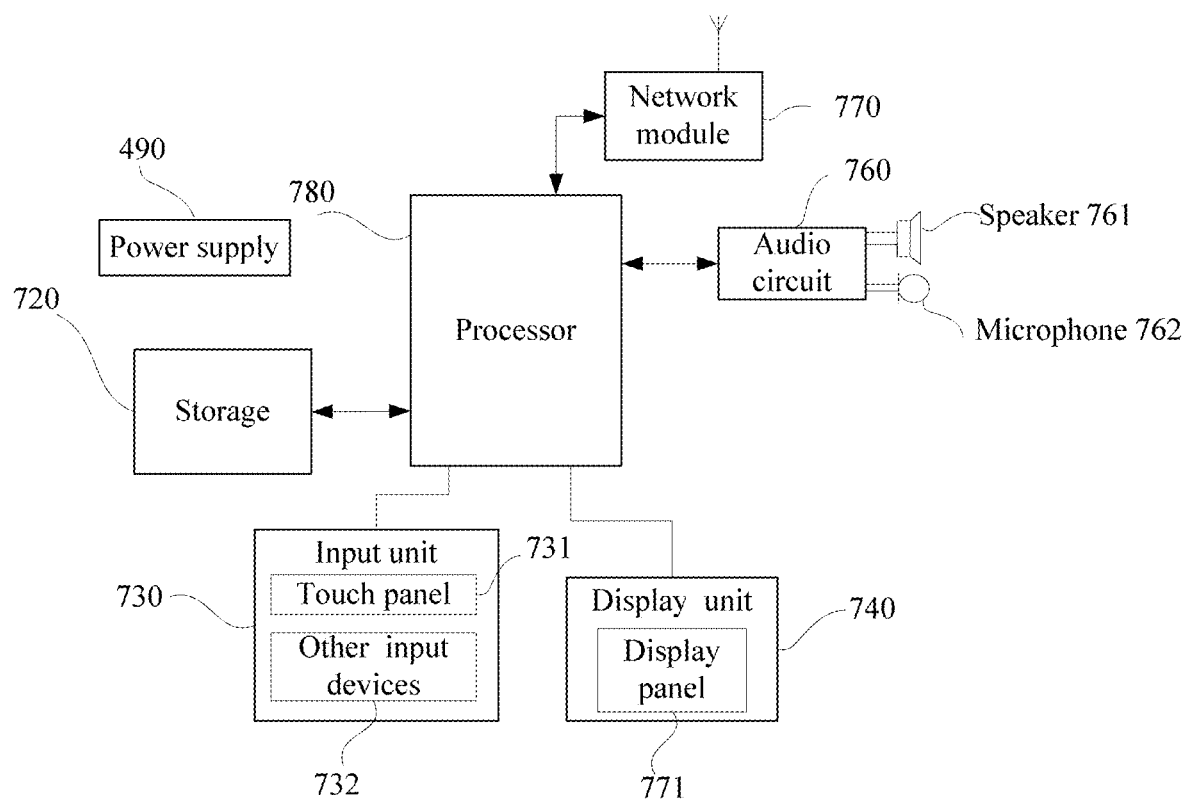
FIG. 7 is a structural diagram of a terminal according to an embodiment of the present disclosure.

FIG. 7 is a structural block diagram of a terminal according to an embodiment of the present disclosure. The terminal according to the embodiment includes a storage 720, an input unit 730, a display unit 740, an audio circuit 760, a network module 770, a processor 780 and a power supply 790. It should be understood by those skilled in the art that, a structure of the terminal shown in FIG. 7 is not intended to limit the terminal, and may include components more or less than those shown in FIG. 7, or may include a combination of some components or components with a different arrangement.

In the following, the components of the terminal are described in detail in conjunction with FIG. 7.

The storage 720 may be configured to store software programs and modules. The processor 780 performs various function applications and data processing for the terminal through running the software programs and modules stored in the storage 720. The storage 720 may mainly include a program storage area and a data storage area. The program storage area may store an operation system, an application required for at least one function (such as a sound playing function and an image playing function), and the like. The data storage area may store data (such as audio data and phone book) created based on terminal utilization, and the like. Furthermore, the storage 720 may include a high-speed random access memory or a nonvolatile memory, such as at least one magnetic disk memory, a flash memory device or other volatile solid-state memory device.

The input unit 730 may be configured to receive inputted digital information or character information, and generate a key signal input related to a user settings and function control of the terminal. Specifically, the input unit 730 may include a touch panel 731 and other input devices 732. The touch panel 731, also referred to as a touch screen, can collect touch operations (for example, operations on the touch panel 1131 or in the vicinity of the touch panel 731 which are performed by the user through any suitable object or accessory such as a finger or a touch pen) thereon or in the vicinity thereof, and drive a corresponding connection device according to a preset program. Optionally, the touch panel 731 may include a touch detection device and a touch controller. The touch detection device detects a touch position of the user and a signal caused by the touch operation, and transmits the signal to the touch controller. The touch controller receives touch information from the touch detection device, converts the touch information into touch coordinates, transmits the touch coordinates to the processor 780, and receives a command from the processor 780 to execute. The touch panel 731 may be implemented as various types such as a resistive touch panel, a capacitive touch panel, an infrared touch panel and a surface acoustic wave touch panel. The input unit 730 may further include other input devices 732 in addition to the touch panel 731. Specifically, the other input devices 732 may include but is not limited to one or more of a physical keyboard, a function key (such as a volume control button and a switch button), a trackball, a mouse and a lever.

The display unit 740 may be configured to display information inputted by the user or information provided to the user and various menus of the terminal. The display unit 740 may include a display panel 741. Optionally, the display panel 741 may be configured in the form of a liquid crystal display (Liquid Crystal Display, LCD), an organic light-emitting diode (Organic Light-Emitting Diode, OLED) or the like. Further, the display panel 741 may be covered by the touch panel 731. In a case that the touch panel 731 detects a touch operation thereon or in the vicinity thereof, the touch panel 731 transmits the touch operation to the processor 780 to determine a type of the touch event. The processor 780 provides a corresponding visual output on the display panel 741 based on the type of the touch event. In FIG. 7, the touch panel 731 and the display panel 741 are two separate components to realize an input function and an input function of the terminal, however, the touch panel 731 and the display panel 741 may be integrated to realize the input function and the output function of the terminal in some embodiments.

The audio circuit 760, a speaker 761 and a microphone 762 may provide an audio interface between the user and the terminal. The audio circuit 760 may convert received audio data into an electrical signal and transmit the electrical signal to the speaker 761, and the speaker 761 converts the electrical signal into a sound signal to output. In another aspect, the microphone 762 converts the collected sound signal into an electrical signal, the electrical signal is received by the audio circuit 760 and is converted into audio data, and the audio data is outputted to the processor 780 for processing. The processed data is transmitted to another terminal via a network module 710, or the audio data is outputted to the storage 720 for further processing.

The network module 770 may include a wireless fidelity (wireless fidelity, WiFi) module, a wired network module or a radio frequency module. The wireless fidelity module adopts a short-distance wireless transmission technology. The terminal may assist the user in sending and receiving e-mails, browsing a webpage, accessing a streaming media and the like via the network module 770, thereby providing a wireless broadband Internet access to the user. The network module 770 is shown in FIG. 7, however, it can be understood that the network module 770 is not a necessary component of the terminal and can be omitted as needed without changing the scope of the present disclosure.

The processor 780 is a control center of the terminal, and connects various parts of the terminal via various interfaces and lines. The processor 780 performs various functions of the terminal and processes data through running or executing the software programs and/or modules stored in the storage 720 and calling the data stored in the storage 720, to monitor the whole terminal. Optionally, the processor 780 may include one or more processing units. Preferably, an application processor and a modem processor may be integrated into the processor 780. The application processor mainly processes an operation system, a user interface, an application, and the like, and the modem processor mainly processes wireless communication. It can be understood that, the modem processor described above may not be integrated into the processor 780.

The terminal may further include a power supply 790 (e.g. a battery) supplying power to various components. Preferably, the power supply may be logically connected to the processor 780 via a power management system, thereby achieving functions such as charge management, discharge management and power consumption management via the power management system.

Although not illustrated, the terminal may further include a camera, a Bluetooth module, and the like, which are not described herein.

In the embodiment of the present disclosure, the processor 780 included in the terminal is further configured to perform an interaction method based on a network picture. The method includes:

obtaining a network picture including a human image;

determining a region where a specific part of the human image in the network picture is located; and receiving an interaction instruction located in the region where the specific part is located and generating interaction information corresponding to the specific part.

In addition, a program product storing machine readable instruction codes is further provided according to the embodiments of the present disclosure. The interaction method based on the network picture according to the embodiments of the present disclosure described above may be performed when the instruction codes described above are read and executed. Correspondingly, various storage mediums for hosting the program product such as a magnetic disk, an optical disk, a magneto-optical disk and a semiconductor memory are also included in the present disclosure.

The machine readable storage mediums described above include but are not limited to various storages and storage units, a semiconductor device, a magnetic disk unit such as an optical disk, a magnetic disk and a magneto-optical disk, and other mediums adapted to store information.

The foregoing are only preferred embodiments of the present disclosure and therefore are not intended to limit the present disclosure. Any change, equivalent substitution, improvement and the like made within the spirit and principle of the present disclosure will fall within the scope of protection of the present disclosure.

What is claimed is:

1. An interaction method based on a network picture, comprising:
obtaining, by a second electronic device, the network picture comprising a human image, wherein the network picture is sent by a first electronic device;

determining, by the second electronic device, a region where a specific part of the human image in the network picture is located;

obtaining, by the second electronic device, human label information of the specific part provided by the first electronic device, wherein the human label information is generated based on image matching based on a feature matching algorithm of the specific part; wherein the human label information is further based on received label information input by a user of the first electronic device;

wherein the human label information indicates human classification based on age; and receiving an interaction instruction located in the region where the specific part is located, and, in response to receiving the interaction instruction, obtaining multimedia material corresponding to the specific part and the human label information and adding the multimedia material onto the network picture at the region where the specific part is located, wherein a correspondence among the multimedia material, the human label information, and the specific part is preset;

wherein the obtained multimedia material is based on the indicated human classification.

2. The method according to claim 1, wherein the method further comprises:

in response to receiving the interaction instruction, processing the network picture by calling a filter to show an effect of applying the multimedia material on the network picture.

3. The method according to claim 2, wherein the filter comprises a wave filter, a transparent filter and a mask filter.

4. The method according to claim 3, wherein the specific part comprises a head, a shoulder and a hand.

5. The method according to claim 2, wherein the specific part comprises a head, a shoulder and a hand.

6. The method according to claim 1, wherein the method further comprises:

generating comment information based on the interaction instruction and the specific part, and recording the comment information at a location on a page where the network picture is located, by the second electronic device.

7. The method according to claim 6, wherein the specific part comprises a head, a shoulder and a hand.

8. The method according to claim 1, wherein the determining, by the second electronic device, the region where the specific part of the human image in the network picture is located comprises:

obtaining the specific part of the human image through identifying the human image, or obtaining the specific part of the human image through receiving identity information of the specific part of the human image set by the user.

9. The method according to claim 8, wherein the specific part comprises a head, a shoulder and a hand.

10. The method according to claim 1, wherein the specific part comprises a head, a shoulder and a hand.

11. An interaction device based on a network picture, comprising one or more processors and a storage medium storing operation instructions, wherein the one or more processors perform the following steps when the operation instructions in the storage medium are executed:

obtaining the network picture comprising a human image, wherein the network picture is sent by another electronic device;

determining a region where a specific part of the human image in the network picture is located;

obtaining human label information of the specific part provided by the another electronic device, wherein the human label information is generated based on image matching based on a feature matching algorithm of the specific part; wherein the human label information is further based on received label information input by a user of the another electronic device;

wherein the human label information indicates human classification based on age; and receiving an interaction instruction located in the region where the specific part is located, and, in response to receiving the interaction instruction, obtaining multimedia material corresponding to the specific part and the human label information and adding the multimedia material onto the network picture at the region where the specific part is located, wherein a correspondence among the multimedia material, the human label information, and the specific part is preset;

wherein the obtained multimedia material is based on the indicated human classification.

12. The device according to claim 11, wherein the one or more processors further perform the following steps:

in response to receiving the interaction instruction, processing the network picture by calling a filter to show an effect of applying the multimedia material on the network picture.

13. The device according to claim 11, wherein the one or more processors further perform the following steps:

generating comment information based on the interaction instruction and the specific part, and recording the comment information at a location on a page where the network picture is located.

* * * * *